United States Patent [19]

Rhee et al.

[11] Patent Number: 5,736,237
[45] Date of Patent: Apr. 7, 1998

[54] GEOMEMBRANES

[75] Inventors: Aaron Seung-Joon Rhee; Antonios Nicholas, both of Belle Mead, N.J.

[73] Assignee: Union Carbide Chemicals & Plastics Technology Corporation, Danbury, Conn.

[21] Appl. No.: 753,362

[22] Filed: Nov. 25, 1996

[51] Int. Cl.$^6$ ............................................ C08L 23/08
[52] U.S. Cl. ........................... 428/220; 428/500; 428/516; 525/53; 525/240; 525/247; 324/326; 324/557
[58] Field of Search .................................. 428/215, 220, 428/500, 516; 525/240, 247, 53; 324/557, 326

[56] References Cited

U.S. PATENT DOCUMENTS

| | | | |
|---|---|---|---|
| 4,828,906 | 5/1989 | Nishimura et al. | 525/240 X |
| 5,047,468 | 9/1991 | Lee et al. | 525/53 |
| 5,100,979 | 3/1992 | Eisinger et al. | 526/88 |
| 5,106,926 | 4/1992 | Eisinger et al. | 526/88 |
| 5,221,570 | 6/1993 | Gokcen et al. | 428/215 |
| 5,284,613 | 2/1994 | Ali et al. | 525/240 X |
| 5,326,602 | 7/1994 | Rifi | 428/35.7 |
| 5,338,589 | 8/1994 | Böhm et al. | 428/36.9 |
| 5,503,914 | 4/1996 | Michie, Jr. et al. | 428/220 |
| 5,514,455 | 5/1996 | Michie, Jr. et al. | 428/220 |
| 5,539,076 | 7/1996 | Nowlin et al. | 525/240 X |
| 5,589,539 | 12/1996 | Wagner et al. | 525/240 X |

OTHER PUBLICATIONS

Hoffman et al, Extensional Behavior, etc., Journal of Plastic Film & Sheeting, vol. 10, Jul. 1994, pp. 235 to 247.

*Primary Examiner*—Fred Teskin
*Attorney, Agent, or Firm*—Saul R. Bresch

[57] ABSTRACT

A sheet such as a geomembrane consisting essentially of an extruded in situ blend of two copolymers of ethylene and one or more alpha-olefins having 3 to 8 carbon atoms, said blend having a flow index in the range of about 3 to about 100 grams per 10 minutes; a melt flow ratio in the range of about 50 to about 200; a density in the range of 0.905 to 0.943 gram per cubic centimeter; an Mw/Mn ratio in the range of about 10 to about 50; and a weight average molecular weight in the range of about 180,000 to about 465,000.

7 Claims, No Drawings

GEOMEMBRANES

TECHNICAL FIELD

This invention relates to geomembranes and other forms of sheet extruded from a blend of ethylene copolymers prepared in a series of polymerization reactors.

BACKGROUND INFORMATION

There has been a rapid growth in the market for linear low density polyethylene (LLDPE), particularly resin made under mild operating conditions; typically at pressures of 100 to 300 psi and reaction temperatures of less than 100° C. This low pressure process provides a broad range of LLDPE products for blown and cast film, injection molding, rotational molding, blow molding, pipe, tubing, and wire and cable applications. LLDPE has essentially a linear backbone with only short chain branches, about 2 to 6 carbon atoms in length. In LLDPE, the length and frequency of branching, and, consequently, the density, is controlled by the type and amount of comonomer used in the polymerization. Although the majority of the LLDPE resins on the market today have a narrow molecular weight distribution, LLDPE resins with a broad molecular weight distribution are available for a number of non-film applications.

LLDPE resins designed for commodity type applications typically incorporate 1-butene as the comonomer. The use of a higher molecular weight alpha-olefin comonomer produces resins with significant strength advantages relative to those of ethylene/1-butene copolymers. The predominant higher alpha-olefin comonomers in commercial use are 1-hexene, 4-methyl-1-pentene, and 1-octene. The bulk of the LLDPE is used in film products where the excellent physical properties and drawdown characteristics of LLDPE film makes this film well suited for a broad spectrum of applications. Fabrication of LLDPE film is generally effected by the blown film and slot casting processes. The resulting film is characterized by excellent tensile strength, high ultimate elongation, good impact strength, and excellent puncture resistance.

These properties together with toughness are enhanced when the polyethylene is of high molecular weight. However, as the molecular weight of the polyethylene increases, the processability of the resin usually decreases. By providing a blend of polymers, the properties characteristic of high molecular weight resins can be retained and processability, particularly the extrudability (from the lower molecular weight component) can be improved.

The blending of these polymers is successfully achieved in a staged reactor process such as those described in U.S. Pat. Nos. 5,047,468 and 5,126,398. Briefly, the process is one for the in situ blending of polymers wherein a higher density ethylene copolymer is prepared in a high melt index reactor and a lower density ethylene copolymer is prepared in a low melt index reactor. The process typically comprises continuously contacting, under polymerization conditions, a mixture of ethylene and one or more alpha-olefins with a catalyst system in two reactors connected in series, said catalyst system comprising: (i) a supported titanium based catalyst precursor; (ii) an aluminum containing activator compound; and (iii) a hydrocarbyl aluminum cocatalyst, the polymerization conditions being such that an ethylene copolymer having a melt index in the range of about 0.1 to about 1000 grams per 10 minutes is formed in the high melt index reactor and an ethylene copolymer having a melt index in the range of about 0.001 to about 1 gram per 10 minutes is formed in the low melt index reactor, each copolymer having a density of about 0.860 to about 0.965 gram per cubic centimeter and a melt flow ratio in the range of about 22 to about 70, with the proviso that the mixture of ethylene copolymer matrix and active catalyst formed in the first reactor in the series is transferred to the second reactor in the series.

While the in situ blends prepared as above and the films produced therefrom are found to have the advantageous characteristics heretofore mentioned, industry continues to seek films of various thicknesses with characteristics tailored to particular applications. One such application is that of sheet of which an important example is the geomembrane. Sheet is characterized in this specification as having a thickness greater than 10 mils as opposed to film, which is characterized by a thickness of 10 mils or less. Many of the characteristics of sheet are similar to film, but its applications fall into those areas where film would be too fragile such as geomembranes, truck bed liners, radiator shrouds, wheel well liners, and sandbox liners. Sheet can be produced in various forms including those having smooth, embossed, or textured surfaces. It is also used in multiple layers when the nature of the application demands an even heavier product.

Geomembranes, which is the application of most interest here, are made from continuous polymeric sheets that are impermeable and quite flexible. Their primary function is as a barrier to liquids and gases.

Various operations during installation of a geomembrane can result in scratching or scoring, altering the geomembrane's ability to stretch or conform. Further, in applications where subsidence is probable, such as landfill caps or liners, the geomembrane's ability to multiaxially elongate and relieve stress is important. Conformability to surfaces can add to slip resistance, even with textured geomembranes, improving soil retention, maximum slope angles, and pull-out resistance. Resistance to puncture by substrates can be enhanced when conformance leads to relaxation of the geomembrane and stress removal. To be commercially acceptable, then, geomembranes should have a high level of three dimensional extensibility; be easy to process; have relatively high ultraviolet (UV) resistance; and have good mechanical properties and chemical resistance. To meet these prerequisites, the selection of the particular polyethylene resin becomes paramount.

In addition to the LLDPE mentioned above, two other polyethylenes are of interest here. They are VLDPE (very low density polyethylene having a density of less than 0.915 gram per cubic centimeter) and MDPE (medium density polyethylene having a density in the range of 0.926 to 0.940 gram per cubic centimeter). LLDPE has a density in the range of 0.915 to 0.925 gram per cubic centimeter. Note that VLDPE and MDPE are also linear. It is found that unimodal VLDPEs made with a vanadium based catalyst, when converted to geomembranes, meet the above prerequisites except that they exhibit low UV resistance; unimodal VLDPEs made with titanium based catalysts, when converted, are substantially higher in UV resistance than the vanadium based VLDPEs, but are difficult to process; and unimodal LLDPEs and MDPEs, when converted, have relatively poor three dimensional extensibility. Thus, it would be desirable to provide geomembranes based on polyethylenes, which, after conversion, handily meet all of the above prerequisites. It is apparent that these properties would also be advantageous in sheet destined for other applications.

DISCLOSURE OF THE INVENTION

An object of this invention, therefore, is to provide sheet, particularly geomembranes, which exhibits the aforementioned exemplary qualities. Other objects and advantages will become apparent hereinafter.

According to the present invention such sheet has been discovered, the sheet being extruded from an in situ blend produced by a variation of the process outlined above. The sheet has a gauge of greater than about 10 mils and consists essentially of an extruded in situ blend of two copolymers of ethylene and one or more alpha-olefins having 3 to 8 carbon atoms, said blend having a flow index in the range of about 3 to about 100 grams per 10 minutes; a melt flow ratio in the range of about 50 to about 200; a density in the range of 0.905 to 0.943 gram per cubic centimeter; an Mw/Mn ratio in the range of about 10 to about 50; and a weight average molecular weight in the range of about 180,000 to about 465,000.

DESCRIPTION OF THE PREFERRED EMBODIMENT(S)

The gauge or thickness of the sheet is greater than about 10 mils. The geomembrane, however, is preferably in the range of about 20 to about 200 mils, and is more preferably in the range of about 40 to about 100 mils. The optimum gauge for geomembranes is about 60 mils. The sheet can be formed by extrusion or two or more sheets can be formed by co-extrusion or laminated together by other means.

The extruder is a conventional one using a die, which will provide the desired gauge. Examples of various extruders, which can be used in forming the sheet are the single screw type modified with a round die or a flat die with continuous take off equipment. A typical single screw type extruder can be described as one having a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and multiple heating zones from the rear heating zone to the front heating zone, the multiple sections and zones running from upstream to downstream. If it has more than one barrel, the barrels are connected in series. The length to diameter ratio of each barrel is in the range of about 16:1 to about 30:1. The extrusion can take place at temperatures in the range of about 175 to about 280 degrees C., and is preferably carried out at temperatures in the range of about 190 to about 250 degrees C.

The blend, which is used in the extruder, is produced in two staged reactors connected in series wherein a mixture of resin and catalyst precursor is transferred from the first reactor to the second reactor in which another copolymer is prepared and blends in situ with the copolymer from the first reactor.

The copolymers produced in each of the reactors are copolymers of ethylene and at least one alpha-olefin comonomer. The relatively high molecular weight copolymer is produced in what is referred to as the high molecular weight reactor, and the relatively low molecular weight copolymer is produced in what is referred to as the low molecular weight reactor. The alpha-olefin comonomer(s), which can be present in the high molecular weight reactor, can have 3 to 8 carbon atoms. The alpha-olefin comonomer (s), which can be present in the low molecular weight reactor, can also have 3 to 8 carbon atoms. The alpha-olefins are exemplified by propylene, 1-butene, 1-hexene, 4-methyl-1-pentene, or 1-octene. Any of the aforementioned comonomers can be used in either reactor.

Preferred comonomer combinations are as follows:

| high mol wt reactor | low mol wt reactor |
|---|---|
| 1-hexene | 1-butene |
| 1-butene | 1-butene |
| 1-butene | 1-hexene |
| 1-hexene | 1-hexene |

It will be understood that generally the in situ blend can be characterized as a bimodal resin. In some cases, however, the two components making up the blend are sufficiently close in average molecular weight that there is no discernible discontinuity in the molecular weight curve. The properties of bimodal resins are strongly dependent on the proportion of the high molecular weight component, i.e., the low melt index component. For a staged reactor system, the proportion of the high molecular weight component is controlled via the relative production rate in each reactor. The relative production rate in each reactor can, in turn, be controlled by a computer application program, which monitors the production rate in the reactors (measured by heat balance) and then manipulates the ethylene partial pressure in each reactor and catalyst feed rate in order to meet the production rate, the production rate split, and catalyst productivity requirements.

The in situ blending can be achieved by the processes described in U.S. Pat. Nos. 5,047,468 and 5,126,398. A typical catalyst system used in in situ blending is a magnesium/titanium based catalyst system, which can be exemplified by the catalyst system described in U.S. Pat. No. 4,302,565 although the precursor is preferably unsupported. Another preferred catalyst system is one where the precursor is formed by spray drying and used in slurry form. Such a catalyst precursor, for example, contains titanium, magnesium, and aluminum halides, and an electron donor, and is attached to the surface of silica. The precursor is then introduced into a hydrocarbon medium such as mineral oil to provide the slurry form. See U.S. Pat. No. 5,290,745.

The electron donor, if used in the catalyst precursor, is an organic Lewis base, liquid at temperatures in the range of about 0° C. to about 200° C., in which the magnesium and titanium compounds are soluble. The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethyl formate, methyl acetate, ethyl anisate, ethylene carbonate, tetrahydropyran, and ethyl propionate.

While an excess of electron donor is used initially to provide the reaction product of titanium compound and electron donor, the reaction product finally contains about 1 to about 20 moles of electron donor per mole of titanium compound and preferably about 1 to about 10 moles of electron donor per mole of titanium compound.

An activator compound, which is generally used with any of the titanium based catalyst precursors, can have the formula $AlR_aX_bH_c$ wherein each X is independently chlorine, bromine, iodine, or OR'; each R and R' is independently a saturated aliphatic hydrocarbon radical having 1 to 14 carbon atoms; b is 0 to 1.5; c is 0 or 1; and a+b+c=3. Preferred activators include alkylaluminum mono- and dichlorides wherein each alkyl radical has 1 to 6 carbon atoms and the trialkylaluminums. A particularly preferred activator is a mixture of diethylaluminum chloride and tri-n-hexylaluminum. About 0.10 to about 10 moles, and preferably about 0.15 to about 2.5 moles, of activator are used per mole of electron donor. The molar ratio of activator to titanium is in the range of about 1:1 to about 10:1 and is preferably in the range of about 2:1 to about 5:1.

The hydrocarbyl aluminum cocatalyst can be represented by the formula $R_3Al$ or $R_2AlX$ wherein each R is independently alkyl, cycloalkyl, aryl, or hydrogen; at least one R is hydrocarbyl; and two or three R radicals can be joined to form a heterocyclic structure. Each R, which is a hydrocarbyl radical, can have 1 to 20 carbon atoms, and preferably has 1 to 10 carbon atoms. X is a halogen, preferably chlorine, bromine, or iodine. Examples of hydrocarbyl aluminum compounds are as follows: triisobutylaluminum, tri-n-hexylaluminum, di-isobutyl-aluminum hydride, dihexylaluminum hydride, di-isobutyl-hexylaluminum, isobutyl dihexylaluminum, trimethyl-aluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, tritolylaluminum, dibutylaluminum chloride, diethylaluminum chloride, and ethylaluminum sesquichloride. The cocatalyst compounds can also serve as activators and modifiers.

As noted above, it is preferred not to use a support. However, in those cases where it is desired to support the precursor, silica is the preferred support. Other suitable supports are inorganic oxides such as aluminum phosphate, alumina, silica/alumina mixtures, silica modified with an organoaluminum compound such as triethylaluminum, and silica modified with diethyl zinc. A typical support is a solid, particulate, porous material essentially inert to the polymerization. It is used as a dry powder having an average particle size of about 10 to about 250 microns and preferably about 30 to about 100 microns; a surface area of at least 200 square meters per gram and preferably at least about 250 square meters per gram; and a pore size of at least about 100 angstroms and preferably at least about 200 angstroms. Generally, the amount of support used is that which will provide about 0.1 to about 1.0 millimole of titanium per gram of support and preferably about 0.4 to about 0.9 millimole of titanium per gram of support. Impregnation of the above mentioned catalyst precursor into a silica support can be accomplished by mixing the precursor and silica gel in the electron donor solvent or other solvent followed by solvent removal under reduced pressure. When a support is not desired, the catalyst precursor can be used in liquid form.

Activators can be added to the precursor either before and/or during polymerization. In one procedure, the precursor is fully activated before polymerization. In another procedure, the precursor is partially activated before polymerization, and activation is completed in the reactor. Where a modifier is used instead of an activator, the modifiers are usually dissolved in an organic solvent such as isopentane and, where a support is used, impregnated into the support following impregnation of the titanium compound or complex, after which the supported catalyst precursor is dried. Otherwise, the modifier solution is added by itself directly to the reactor. Modifiers are similar in chemical structure and function to the activators. For variations, see, for example, U.S. Pat. No. 5,106,926. The cocatalyst is preferably added separately neat or as a solution in an inert solvent, such as isopentane, to the polymerization reactor at the same time as the flow of ethylene is initiated.

U.S. Pat. No. 5,106,926 provides another example of a magnesium/titanium based catalyst system comprising:

(a) a catalyst precursor having the formula $Mg_dTi(OR)_e X_f(ED)_g$ wherein R is an aliphatic or aromatic hydrocarbon radical having 1 to 14 carbon atoms or COR' wherein R' is a aliphatic or aromatic hydrocarbon radical having 1 to 14 carbon atoms; each OR group is the same or different; X is independently chlorine, bromine or iodine; ED is an electron donor; d is 0.5 to 56; e is 0, 1, or 2; f is 2 to 116; and g is 1.5d+2;

(b) at least one modifier having the formula $BX_3$ or $AlR_{(3-e)}X_e$ wherein each R is alkyl or aryl and is the same or different, and X and e are as defined above for component (a)

wherein components (a) and (b) are impregnated into an inorganic support; and (c) a hydrocarbyl aluminum cocatalyst.

The precursor is prepared from a titanium compound, a magnesium compound, and an electron donor. Titanium compounds, which are useful in preparing these precursors, have the formula $Ti(OR)_eX_h$ wherein R, X, and e are as defined above for component (a); h is an integer from 1 to 4; and e+h is 3 or 4. Examples of titanium compounds are $TiCl_3$, $TiCl_4$, $Ti(OC_2H_5)_2Br_2$, $Ti(OC_6H_5)Cl_3$, $Ti(OCOCH_3)Cl_3$, and $Ti(OCOC_6H_5)Cl_3$. The magnesium compounds include magnesium halides such as $MgCl_2$, $MgBr_2$, and $MgI_2$. Anhydrous $MgCl_2$ is a preferred compound. About 0.5 to 56, and preferably about 1 to 10, moles of the magnesium compounds are used per mole of titanium compounds.

The electron donor, the support, and the cocatalyst are the same as those described above. As noted, the modifier can be similar in chemical structure to the aluminum containing activators. The modifier has the formula $BX_3$ or $AlR_{(3-e)}X_e$ wherein each R is independently alkyl having 1 to 14 carbon atoms; each X is independently chlorine, bromine, or iodine; and e is 1 or 2. One or more modifiers can be used. Preferred modifiers include alkylaluminum mono- and dichlorides wherein each alkyl radical has 1 to 6 carbon atoms; boron trichloride; and the trialkylaluminums. About 0.1 to about 10 moles, and preferably about 0.2 to about 2.5 moles, of modifier can be used per mole of electron donor. The molar ratio of modifier to titanium can be in the range of about 1:1 to about 10:1 and is preferably in the range of about 2:1 to about 5:1.

The entire catalyst system, which includes the precursor or activated precursor and the cocatalyst, is added to the first reactor. The catalyst is admixed with the copolymer produced in the first reactor, and the mixture is transferred to the second reactor. Insofar as the catalyst is concerned, only cocatalyst is added to the second reactor from an outside source.

The polymerization in each reactor is, preferably, conducted in the gas phase using a continuous fluidized process. A typical fluidized bed reactor is described in U.S. Pat. No. 4,482,687.

A relatively low melt index (or high molecular weight) copolymer is preferably prepared in the first reactor, and the relatively high melt index (or low molecular weight) copolymer is prepared in the second reactor. This can be referred to as the forward mode. Alternatively, the relatively low molecular weight copolymer can be prepared in the first reactor and the relatively high molecular weight copolymer can be prepared in the second reactor. This can be referred to as the reverse mode.

The first reactor is generally smaller in size than the second reactor because only a portion of the final product is made in the first reactor. The mixture of polymer and an active catalyst is usually transferred from the first reactor to the second reactor via an interconnecting device using nitrogen or second reactor recycle gas as a transfer medium.

In the high molecular weight reactor:

Because of the low values, instead of melt index, flow index is determined and those values are used in this specification. The flow index can be in the range of about 0.01 to about 40 grams per 10 minutes, and is preferably in the range of about 0.2 to about 1 gram per 10 minutes. The weight average molecular weight of this polymer is, generally, in the range of about 400,000 to about 500,000. The density of the copolymer is at least 0.860 gram per cubic centimeter, and is preferably in the range of 0.900 to 0.930 gram per cubic centimeter. The melt flow ratio of the polymer can be in the range of about 20 to about 70, and is preferably about 22 to about 45.

Melt index is determined under ASTM D-1238, Condition E. It is measured at 190° C. and 2.16 kilograms and reported as grams per 10 minutes. Flow index is determined under ASTM D-1238, Condition F. It is measured at 190° C. and 10 times the weight used in determining the melt index, and reported as grams per 10 minutes. Melt flow ratio is the ratio of flow index to melt index.

In the low molecular weight reactor:

A relatively high melt index (or low molecular weight) copolymer is prepared in this reactor. The high melt index can be in the range of about 50 to about 3000 grams per 10 minutes, and is preferably in the range of about 100 to about 1500 grams per 10 minutes. The weight average molecular weight of the high melt index copolymer is, generally, in the range of about 10,000 to about 30,000. The density of the copolymer prepared in this reactor can be at least 0.900 gram per cubic centimeter, and is preferably in the range of 0.925 to 0.950 gram per cubic centimeter. The melt flow ratio of this copolymer can be in the range of about 20 to about 70, and is preferably about 20 to about 45.

The blend or final product, as removed from the second reactor, can have a flow index in the range of about 3 to about 100 grams per 10 minutes, and preferably has a flow index in the range of about 5 to about 90 grams per 10 minutes. The melt flow ratio can be in the range of about 50 to about 200. The weight average molecular weight of the final product is, generally, in the range of about 180,000 to about 465,000. The density of the blend can be at least 0.905 gram per cubic centimeter, and is preferably in the range of 0.910 to 0.943 gram per cubic centimeter.

As noted above, the blend has a broad molecular weight distribution which can be generally characterized as bimodal. The broad molecular weight distribution is reflected in an Mw/Mn ratio of about 10 to about 50, preferably about 20 to about 40. Mw is the weight average molecular weight; Mn is the number average molecular weight; and the Mw/Mn ratio can be referred to as the polydispersity index, which is a measure of the breadth of the molecular weight distribution.

The weight ratio of copolymer prepared in the high molecular weight reactor to copolymer prepared in the low molecular weight reactor can be in the range of about 0.5:1 to about 2:1. The weight ratio is preferably in the range of about 1:1 to about 1.6:1, and the optimum weight ratio is about 1.4:1.

The magnesium/titanium based catalyst system, ethylene, alpha-olefin(s), and hydrogen are continuously fed into the first reactor; the polymer/catalyst mixture is continuously transferred from the first reactor to the second reactor; ethylene, alpha-olefin(s), and hydrogen, as well as cocatalyst are continuously fed to the second reactor. The final product is continuously removed from the second reactor.

In the high molecular weight reactor:

The mole ratio of alpha-olefin to ethylene can be in the range of about 0.05:1 to about 0.4:1, and is preferably in the range of about 0.1:1 to about 0.25:1. The mole ratio of hydrogen (if used) to ethylene can be in the range of about 0.0001:1 to about 0.3:1, and is preferably in the range of about 0.0005:1 to about 0.15:1. The operating temperature is generally in the range of about 60° C. to about 100° C. Preferred operating temperatures vary depending on the density desired, i.e., lower temperatures for lower densities and higher temperatures for higher densities.

In the low molecular weight reactor:

The mole ratio of alpha-olefin to ethylene can be in the range of about 0.05:1 to about 0.6:1, and is preferably in the range of about 0.2:1 to about 0.5:1. The mole ratio of hydrogen to ethylene can be in the range of about 1:1 to about 2.5:1, and is preferably in the range of about 1.2:1 to about 2.2:1. The operating temperature is generally in the range of about 70° C. to about 100° C. As mentioned above, the temperature is preferably varied with the desired density.

The pressure is generally the same in both the first and second reactors. The pressure can be in the range of about 200 to about 450 psi and is preferably in the range of about 280 to about 350 psig.

A typical fluidized bed reactor can be described as follows:

The bed is usually made up of the same granular resin that is to be produced in the reactor. Thus, during the course of the polymerization, the bed comprises formed polymer particles, growing polymer particles, and catalyst particles fluidized by polymerization and modifying gaseous components introduced at a flow rate or velocity sufficient to cause the particles to separate and act as a fluid. The fluidizing gas is made up of the initial feed, make-up feed, and cycle (recycle) gas, i.e., comonomers and, if desired, modifiers and/or an inert carrier gas.

The essential parts of the reactor system are the vessel, the bed, the gas distribution plate, inlet and outlet piping, a compressor, cycle gas cooler, and a product discharge system. In the vessel, above the bed, there is a velocity reduction zone, and, in the bed, a reaction zone. Both are above the gas distribution plate.

Conventional additives, which can be introduced into the blend, are exemplified by antioxidants, ultraviolet absorbers, antistatic agents, pigments, dyes, nucleating agents, fillers, slip agents, fire retardants, plasticizers, processing aids, lubricants, stabilizers, smoke inhibitors, viscosity control agents, and crosslinking agents, catalysts, and boosters, tackifiers, and anti-blocking agents. Except for carbon black discussed below, the additives are generally present in the blend in amounts of about 0.01 to about 10 parts by weight of additive for each 100 parts by weight of polymer blend.

Advantages of the invention insofar as it applies to geomembranes lie in a geomembrane, which will respond to subsidence without breaking or being punctured, and will conform to the surface to which it is applied. This is a result of its three dimensional extensibility. The total level of three dimensional extensibility of polyethylenes is a strong function of density. Thus, VLDPEs exhibit high levels of three dimensional extensibility while MDPEs and LLDPEs normally exhibit much lower levels of three dimensional extensibility. Subject invention, on the other hand, has all of the advantages of an LLDPE with the additional advantage of exhibiting a high level of three dimensional extensibility similar to VLDPE. The geomembrane of the invention further demonstrates relatively high UV resistance, mechanical properties, and chemical resistance, and can be processed with facility. Other forms of sheet have similar advantages.

It should be noted that The Society of the Plastics Industry differentiates sheet from film using 12 mils as the boundary. As noted above, in this specification, the borderline is 10 mils.

Almost all geomembrane sheets are black, and contain 1 to 45 percent by weight carbon black. About 2 to about 3 percent by weight carbon black is typically needed to protect the sheet against degradation by ultraviolet light, and about 5 to about 45 percent by weight is needed to make the sheet electrically conductive. Typical carbon blacks used for UV protection are N-550 and N-110 carbon blacks. N-110 is finer than N-550 and, therefore, is more efficient in this regard. Carbon blacks are also used to make the sheet conductive. Electrically conductive geomembranes allow one to detect pin holes in the sheet. Some geomembranes, especially those having multiple layers, are provided with one white surface through the addition of titanium dioxide. The purpose of this addition is to prevent the geomembranes from getting too hot from solar radiation during installation.

Patents mentioned in this specification are incorporated by reference herein.

The invention is illustrated by the following examples.

EXAMPLES 1 TO 15

The in situ blends, which are extruded into the geomembranes of the invention are prepared as follows:

The preferred catalyst system is one where the precursor is formed by spray drying and is used in slurry form. Such a catalyst precursor, for example, contains titanium, magnesium, and aluminum halides, and an electron donor, and is attached to the surface of silica. The precursor is then introduced into a hydrocarbon medium such as mineral oil to provide the slurry form. See U.S. Pat. No. 5,290,745 ('745). The catalyst composition and method of preparing same used in these examples is of the same composition and preparation method as example 1 of '745 except that diethylaluminum chloride and tri-n-hexylaluminum are not used.

Polyethylene is produced using the following standard procedure: Ethylene is copolymerized with 1-hexene (first reactor) and 1-butene (second reactor). Triethylaluminum (TEAL) cocatalyst is added to each reactor during polymerization as an 11.2 weight percent solution in isopentane. The pressure in each reactor is 300 psia. Each polymerization is continuously conducted after equilibrium is reached.

Polymerization is initiated in the first reactor by continuously feeding the above catalyst precursor and cocatalyst triethylaluminum (TEAL), and into a fluidized bed of polyethylene granules together with ethylene, 1-hexene, and hydrogen. The TEAL is first dissolved in isopentane (5 percent by weight TEAL). The resulting copolymer mixed with active catalyst is withdrawn from the first reactor and transferred to the second reactor using nitrogen as a transfer medium. The second reactor also contains a fluidized bed of polyethylene granules. Ethylene, 1-butene, and hydrogen are introduced into the second reactor where they come into contact with the copolymer and catalyst from the first reactor. Additional cocatalyst is also introduced. The product blend, which is referred to as Resin A, is continuously removed. Resin A is the resin used to prepare the geomembrane embodiment of the invention. The variables are set forth in Table I. The properties of Resin A are shown as the second reactor resin properties in Table I.

TABLE I

| reaction conditions | first reactor | second reactor |
|---|---|---|
| temperature (°C) | 86.9 | 83.0 |
| pressure (psia) | 300 | 300 |
| C2 partial pressure(psia) | 21.4 | 70.7 |
| H2/C2 molar ratio | 0.002 | 1.70 |
| C6/C2 molar ratio | 0.148 | 0.0023 |
| C4/C2 molar ratio | — | 0.349 |
| catalyst precursor feed rate(lbs/hr) | 13 | — |
| TEAL feed rate (lbs/hr) | 84 | 48.5 |
| production rate (lbs/hr) | 20,100 | 13,200 |
| bed weight(lbs) | 56,700 | 70,300 |
| bed level (feet) | 38.2 | 40.3 |
| residence time (hrs) | 2.82 | 2.11 |
| space/time/yield (lbs/hr/cu ft) | 5.04 | 3.30 |
| recycle hexane (mol %) | 2 | — |
| weight percent condensing | 8.4 | — |
| resin properties | | |
| flow index (g/10 min) | 0.42 | 8.3 |
| melt index ($I_5$) (g/10 min) | — | 0.28 |
| density(g/cc) | 0.9142 | 0.9207 |
| residual titanium(ppm) | 4.8 | 3 |
| bulk density (lbs/cu ft) | 22.3 | 27 |
| average particle size(inch) | 0.032 | 0.029 |
| split (% by wt) | 60 | 40 |

Notes to Tables:

1. Values for the second reactor resin properties are for the final product blend, i.e., Resin A.

2. Density is measured by producing a plaque in accordance with ASTM D-1928, procedure C, and then testing as is via ASTM D-1505.

3. Melt index is determined under ASTM D-1238, Condition E. It is measured at 190° C. and 2.16 kilograms and reported as grams per 10 minutes. At 2.16 kilograms, the melt index can also be referred to a $I_2$. At 5 kilograms, the melt index is referred to as $I_5$.

4. Flow index is determined under ASTM D-1238, Condition F. It is measured at 190° C. and 10 times the weight used in determining the melt index, and reported as grams per 10 minutes. The flow index can also be referred to as $I_{21}$.

5. Melt flow ratio is the ratio of flow index to melt index.

6. The molecular weight distribution is determined via Size Exclusion Chromatography using a Waters™ 150C with trichlorobenzene as solvent at 140 degrees C. with a broad molecular weight distribution standard and broad molecular weight distribution calibration method.

7. Py=air pressure at yield.

8. Pb=air pressure at burst.

9. Vb=air volume at Pb.

10. PbVb=Work, which is the total amount of energy needed to burst a geomembrane specimen via the test method defined in paragraph 11.

11. Three dimensional extensional behavior is determined by a burst test. The burst test involves clamping a 7 inch (17.87 centimeters) diameter sample of a geomembrane, which is 20 mil (0.5 millimeter) thick, over a plate equipped with a computer controlled air inlet valve and sensors that monitor air flow and pressure. Air is introduced in increments of 1 psi (0.0069 MPa), and each increment is held for 15 seconds, until the sample yields, enlarges, and bursts. During each increment of pressure, makeup air is introduced as necessary to maintain the pressure. The real time changes of air volume and pressure are recorded. The shape and also the size of an enlarged sample, especially before burst, is normally related to its density, i.e., a half ellipsoid surface for typical MDPEs; a truncated sphere for typical VLDPEs; and a hybrid of an ellipsoid and sphere for typical LLDPEs.

A typical sample yields at Py, enlarges substantially thereafter, and bursts when air volume reaches Vb at an air pressure Pb. The ultimate volume of air that a geomembrane can withstand, Vb, is important where its three dimensional extensibility is necessary for the particular application. Nevertheless, this property alone, without specifying Pb, is not sufficient to comprehensively describe the three dimensional extensional behavior of the geomembrane. In this invention, ultimate work, i.e., PbVb, of geomembranes is used primarily to differentiate the three dimensional extensional behavior of different polyethylenes while Vb can also be used, if desired.

12. The tests in Table III are carried out on plaques under ASTM D 638. It should be noted that the uniaxial performance tested here is not a predictor of multiaxial capability.

Thirteen other resins are prepared, extruded into 20 mil thick geomembranes, and compared with the 20 mil thick geomembrane made from Resin A. The extrusions are effected on a 2½ inch single screw Prodex™ extrusion line (60 mil die gap) under the conditions described below. It is found that the processability of Resin A is very good for 20 mil geomembranes and good for 40 mil geomembranes.

The following additives are added to each resin prior to or during extrusion in percent by weight based on the weight of the resin:

| additive | percent by weight |
| --- | --- |
| octadecyl 3,5-di-tert-butyl-4-hydroxyhydrocinnamate | 0.045 |
| zinc stearate | 0.075 |
| silica gel | 0.005 |
| bis(2-hydroxyethyl)stearylamine | 0.075 |
| tris(nonylphenyl)phosphite | 0.15 |
| vinylidene fluoride-hexafluoropropene polymer | 0.08 |

The extrusion is conducted on a single screw 2½ inch Prodex™ flat die extrusion line having a 60 mil die gap under the following operating conditions: die width is 2 feet; lip setting is 60 mils; chill roll opening is 40 mils; screen pack in mesh size is 20/60/20; barrel temperature in degrees F. for the rear zone is 342, the center zone 378, and the front zone 380; adapter temperature in degrees F. is 400; melt temperature in degrees F. is 461; die temperature in degrees F. for the left side is 406, the gate 351, the center 402, and the right side 402; the amp meter reading is 25; the extruder screw rpm is 200; the head pressure is 3570 to 3580 psi; the roll temperature in degrees F. for the top is 218, for the center 210, and for the bottom 250; the sheet linear speed is 72.25 inches per minute; the rate is 120 pounds per hour; the gauge variability is 38 to 41; the sheet width is 21.1 inches; and the bottom roll is open.

There are five types of resins. Type I is a bimodal LLDPE. The Type I resin used in example 1 is Resin A. Type II is a bimodal VLDPE and is made by essentially the same procedure as Resin A. Type III is a unimodal LLDPE prepared with a titanium based catalyst according to the preferred process described in U.S. Pat. No. 4,302,565. Type IV resins are unimodal VLDPEs prepared with a vanadium or a titanium based catalyst according to the preferred process described in U.S. Pat. Nos. 4,508,842 and 4,302,565, respectively. Type V resins are unimodal MDPEs prepared with a conventional chromium based catalyst. The material properties of the resins are set forth in Table IIA; the three dimensional extensibility performance is set forth in Table IIB; and various test results are set forth in Table III.

TABLE IIA

| Example | Resin Type | Density (g/cc) | MI (g/10 min) | FI (g/10 min) | Melt Flow Ratio | Mw/Mn | Molecular Weight |
| --- | --- | --- | --- | --- | --- | --- | --- |
| 1 | I | 0.9229 | 0.07 | 9 | 129 | 28.4 | 330,000 |
| 2 | II | 0.9140 | 0.966 | 81 | 84 | — | — |
| 3 | III | 0.917 | 1 | 25 | 25 | — | — |
| 4 | III | 0.916 | 0.5 | 13 | 26 | — | — |
| 5 | III | 0.921 | 0.8 | — | — | — | — |
| 6 | III | 0.917 | 2.5 | — | — | — | — |
| 7 | III | 0.923 | 0.3 | — | — | — | — |
| 8 | III | 0.920 | 0.95 | 24 | 25 | — | — |
| 9 | IV | 0.905 | 0.5 | 23 | 46 | — | — |
| 10 | IV | 0.900 | 0.4 | — | — | — | — |
| 11 | IV | 0.908 | 0.2 | 17 | 85 | 12.7 | 291,000 |
| 12 | IV | 0.910 | 0.5 | — | — | — | — |
| 13 | V | 0.939 | 0.17 | 18 | 106 | 21.2 | 242,000 |
| 14 | V | 0.939 | 0.2 | 24 | 120 | 22.3 | 234,000 |

Table IIB

| Example | Resin Type | Py (psig) | Pb (psig) | Vb (liter) | PbVb (ft lb) |
| --- | --- | --- | --- | --- | --- |
| 1 | I | 20 | 9 | 4.5 | 542.4 |
| 2 | II | 15 | 6 | 6.0 | 631.6 |
| 3 | III | 18 | 12 | 0.45 | 61.1 |
| 4 | III | 17 | 11 | 0.7 | 91.5 |
| 5 | III | 17 | 10 | 1.0 | 125.6 |
| 6 | III | 18 | 12 | 0.7 | 95.0 |
| 7 | III | 22 | 19 | 0.36 | 61.7 |
| 8 | III | 18 | 14 | 0.4 | 58.4 |
| 9 | IV | 13 | 7 | 6.0 | 662.1 |
| 10 | IV | 11 | 5 | 5.5 | 551.0 |
| 11 | IV | 14 | 6 | 6.0 | 631.6 |
| 12 | IV | 14 | 7 | 5.5 | 606.9 |
| 13 | V | 31 | 30 | 0.3 | 68.2 |
| 14 | V | 31 | 30 | 0.3 | 68.2 |

TABLE III

| Example | Yield Stress (psi) | Ultimate Stress (psi) | Ultimate Elongation (percent) | Two Percent Secant Modulus (psi) |
| --- | --- | --- | --- | --- |
| 1 | 1879 | 4315 | 794 | 38,374 |
| 3 | 1782 | 4432 | 740 | 38,358 |
| 4 | 1768 | 4517 | 688 | 36,391 |

The resin of example 1 has a yield strain of 15 percent; an ultimate strain of 794 percent; a melting point of 125.66 degrees C.; and a heat of fusion of 120.1 Joules per gram. The yield stress, ultimate stress, yield strain, and ultimate strain are determined under ASTM D 638 using an average of 5 measurements. The melting points and heat of fusion are determined by differential scanning calorimeter (DSC) using an average of 3 measurements.

EXAMPLES 15 TO 18

Four geomembrane sheets are prepared from Resin A plus additives as in example 1 except that the thicknesses are in the neighborhood of 40 mils. The geomembranes are then tested for various mechanical properties. The results are set forth in Table IV. The NSF-54 (NSF International Standard 54 as revised in 1993) Test Method is used. NSF stands for National Sanitation Foundation. NSF provides a set of standards for geomembranes (or flexible membrane liners) made from various polymers in NSF-54. This standard includes, among other things, the minimum requirements for various geomembranes and the test methods for measuring geomembrane properties.

TABLE IV

| Example | MD/TD | thickness (mil) | elongation at yield (%) | tensile strength at yield (psi) | elongation at break (%) | tensile strength at break (psi) |
|---|---|---|---|---|---|---|
| 15 | MD | 40.8 | 24.4 | 1623 | 653 | 4242 |
|    | TD | 40.7 | 20.4 | 1617 | 738 | 4067 |
| 16 | MD | 40.2 | 24.4 | 1628 | 639 | 4218 |
|    | TD | 39.9 | 20.2 | 1655 | 730 | 3862 |
| 17 | MD | 40.4 | 27.9 | 1611 | 682 | 4256 |
|    | TD | 40.3 | 21.9 | 1642 | 787 | 4530 |
| 18 | MD | 45.4 | 27.2 | 1625 | 673 | 4303 |
|    | TD | 45.5 | 22.9 | 1614 | 878 | 4600 |

MD= machine direction and
TD= transverse direction.

EXAMPLE 19

In this example, the ultraviolet (UV) resistance of the Example 1 resin composition is determined by continuously weathering dog-bone specimens cut out from 80 mil plaques prepared as above. A QUV Weatherometer™ is used with A-340 light bulbs running on a cycle of 20 hours at 70 degrees C. under UV light (dry) and 4 hours at 55 degrees C. dark (wet). The tester is also referred to as "The Q-U-V Accelerated Weathering Tester". It is manufactured by the Q-Panel Company, Cleveland, Ohio. Specimens are taken out after every 200 to 300 hours of weathering and their tensile strengths and elongation values at break are measured. 50 percent loss of elongation at break is the criterion of failure. The values reported are the average values of three measurements or specimens. The composition contains 2.25 weight percent carbon black (N-550).

Typical commercial black medium density polyethylene geomembrane sheets are produced by either adding the carbon black via black masterbatch into the polymer during the sheet conversion process or by directly converting polymer, which already contains carbon black, into sheets. In either case, the amount of carbon black in the sheets varies from 2 to 3 weight percent. The typical amount of carbon black is 2.25 to 2.5 weight percent, and this amount is considered sufficient to protect the sheets from ultraviolet degradation.

The results are reported in Table V. As shown, the composition does not fail for up to about 4100 hours. The composition of example 11, however, fails at about 1200 hours even though it contains the same carbon black in the same amount.

TABLE V

| QUV time (hours) | tensile strength at break (psi) | elongation at break (percent) |
|---|---|---|
| 0 (control) | 4125 | 746 |
| 1580 | 4168 | 793 |
| 1817 | 4040 | 790 |
| 2072 | 4359 | 760 |
| 2432 | 4183 | 774 |
| 2626 | 3938 | 775 |
| 2879 | 4313 | 807 |
| 3120 | 4262 | 797 |
| 3364 | 3936 | 796 |
| 3607 | 3798 | 634 |
| 3863 | 3686 | 737 |
| 4096 | 3911 | 774 |

EXAMPLES 20 TO 26

The geomembrane industry specifies that a geomembrane composition should exhibit a minimum of 100 minutes of oxidation induction time (OIT). Resin A is tested with an antioxidant only or with an additive package. Resin A is mixed with the additives in a Brabender™ mixer at 180 degrees C. for 5 minutes, and double pressed on a slow-cool press at 15 degrees C. OIT is measured at 200 degrees C. using a DuPont™ DSC. The variables and results are set forth in Table VI.

TABLE VI

| example | formulation | OIT (minutes) |
|---|---|---|
| 20 | Resin A plus 0.025 weight percent Antioxidant A | 2.2 |
| 21 | Resin A plus additive package A | 7.2 |
| 22 | Resin A plus additive package B | 21.2 |
| 23 | Resin A plus additive package C | 23.3 |
| 24 | Resin A plus additive package D | 79.2 |
| 25 | Resin A plus additive package E | 84.8 |
| 26 | Resin A plus additive package F | 114.6 |

Antioxidant A is octadecyl 3,5-di-tert-butyl-4-hydroxyhydrocinnamate.

Additive package A contains 0.2 percent by weight of a mixture of 22.5 weight percent octadecyl 3,5-di-tert-butyl-4-hydroxyhydrocinnamate, 2.5 weight percent silica gel, 37.5 weight percent zinc stearate, and 37.5 weight percent bis (2-hydroxyethyl)stearylamine; 0.15 percent by weight tris (nonylphenyl)phosphite; and 0.08 percent by weight vinylidene fluoride-hexafluoropropene polymer.

Additive package B contains 0.3 percent by weight of a mixture of 50 weight percent tetrakis [methylene(3,5-di-tert-butyl-4-hydroxyhydrocinnamate)]methane and 50 weight percent tris(2,4-di-tert-butylphenyl) phosphite; 0.125 percent by weight poly[[6-[(1,1,3,3-tetramethyl-butyl)amino]-s-triazine-2,4-diyl][2,2,6,6-tetramethyl-4-piperidyl)imino] hexamethylene[2,2,6,6-tetramethyl-4-piperidyl)imino]; and 0.1 percent by weight of a mixture of 25 weight percent zinc stearate, 25 weight percent zinc oxide, and 50 weight percent 1,3,5-tris(4-tert-butyl-3-hydroxy-2,6 dimethylbenzyl)-1,3,5-triazine-2,4,6-(1H, 3H, 5H)-trione.

Additive package C contains 0.1 percent by weight tris (2,4-di-tert-butylphenyl) phosphite and 0.2 percent by weight octadecyl 3,5-di-tert-butyl-4-hydroxyhydrocinnamate.

Additive package D contains 0.1 percent by weight tris (2,4-di-tert-butylphenyl) phosphite and 0.2 percent by weight 1,3,5-tris(4-tert-butyl-3-hydroxy-2,6 dimethylbenzyl)-1,3,5-triazine-2,4,6-(1H, 3H, 5H)-trione.

Additive package E contains 0.1 percent by weight tris (2,4-di-tert-butylphenyl) phosphite and 0.2 percent by weight tetrakis [methylene(3,5-di-tert-butyl-4-hydroxyhydrocinnamate)]methane.

Additive package F contains 0.125 percent by weight tris(2,4-di-tert-butylphenyl) phosphite and 0.25 percent by weight tetrakis [methylene(3,5-di-tert-butyl-4-hydroxyhydrocinnamate)]methane. All of the above percentages are based on the weight of Resin A except where components of a mixture are mentioned.

We claim:

1. A sheet having a gauge of greater than 10 mils consisting essentially of an extruded in situ blend of two copolymers of ethylene and one or more alpha-olefins having 3 to 8 carbon atoms, said blend having a flow index in the range of about 3 to about 100 grams per 10 minutes; a melt flow ratio in the range of about 50 to about 200; a density in the range of 0.905 to 0.943 gram per cubic centimeter; an Mw/Mn ratio in the range of about 10 to about 50; and a weight average molecular weight in the range of about 180,000 to about 465,000.

2. The sheet defined in claim 1 wherein the blend is produced in situ by contacting ethylene and at least one alpha-olefin comonomer having 3 to 8 carbon atoms with a magnesium/titanium based catalyst system in each of two reactors connected in series, under polymerization conditions, wherein the polymer formed in one reactor has a relatively high molecular weight; a flow index in the range of about 0.01 to about 40 grams per 10 minutes; and a density in the range of 0.860 to 0.930 gram per cubic centimeter and the polymer formed in the other reactor has a relatively low molecular weight; a melt index in the range of about 50 to about 3000 grams per 10 minutes; and a density in the range of 0.900 to 0.950 gram per cubic centimeter, the weight ratio of high molecular weight polymer to the low molecular weight polymer being in the range of about 0.5:1 to about 2:1.

3. The sheet defined in claim 2 wherein the polymer formed in the high molecular weight reactor has a flow index in the range of about 0.2 to about 1 gram per 10 minutes and a density in the range of 0.900 to 0.930 gram per cubic centimeter and the polymer formed in the low molecular weight reactor has a melt index in the range of about 100 to about 1500 grams per 10 minutes and a density in the range of 0.925 to 0.950 gram per cubic centimeter.

4. The sheet defined in claim 1 wherein the in situ blend has a flow index in the range of about 5 to about 90 grams per 10 minutes; a density in the range of 0.910 to 0.943 gram per cubic centimeter; and an Mw/Mn ratio in the range of about 20 to about 40.

5. The sheet defined in claim 1 wherein the in situ blend is produced under the following conditions:

(i) in the high molecular weight reactor: the mole ratio of alpha-olefin to ethylene is in the range of about 0.05:1 to about 0.4:1 and the mole ratio of hydrogen, if used, to ethylene is in the range of about 0.0001:1 to about 0.3:1; and (ii) in the low molecular weight reactor: the mole ratio of alpha-olefin to ethylene is in the range of about 0.05:1 to about 0.6:1 and the mole ratio of hydrogen to ethylene is in the range of about 1:1 to about 2.5:1.

6. A geomembrane having a gauge in the range of about 20 to 200 mils consisting essentially of an extruded bimodal in situ blend of polyethylenes having a flow index in the range of about 5 to about 90 grams per 10 minutes; a melt flow ratio in the range of about 50 to about 200; a density in the range of 0.910 to 0.943 gram per cubic centimeter; an Mw/Mn ratio in the range of about 20 to about 40; and a weight average molecular weight in the range of about 180,000 to about 465,000, said blend having been produced in situ by contacting ethylene and at least one alpha-olefin comonomer with a magnesium/titanium based catalyst system in each of two reactors connected in series, under polymerization conditions, wherein (i) the comonomer in one reactor is 1-hexene and, optionally, one or more 3 to 5, 7, or 8 carbon atom alpha-olefins and the polymer formed in the reactor has a relatively high molecular weight; a flow index in the range of about 0.2 to about 1 gram per 10 minutes; and a density in the range of 0.900 to 0.930 gram per cubic centimeter and (ii) the comonomer in the other reactor is 1-butene and, optionally, one or more 3 or 5 to 8 carbon atom alpha-olefins and the polymer formed in said other reactor has a relatively low molecular weight; a melt index in the range of about 100 to about 1500 grams per 10 minutes; and a density in the range of 0.925 to 0.950 gram per cubic centimeter, the weight ratio of high molecular weight reactor polymer to the low molecular weight reactor polymer being in the range of about 1:1 to about 1.6:1.

7. The geomembrane defined in claim 6 wherein the blend is produced under the following conditions:

(i) in the high molecular weight reactor: the mole ratio of 1-hexene to ethylene is in the range of about 0.1:1 to about 0.25:1 and the mole ratio of hydrogen, if used, to ethylene is in the range of about 0.0005:1 to about 0.15:1; and (ii) in the low molecular weight reactor: the mole ratio of 1-butene to ethylene is in the range of about 0.2:1 to about 0.5:1 and the mole ratio of hydrogen to ethylene is in the range of about 1.2:1 to about 2.2:1.

* * * * *